United States Patent [19]
Huang

[11] Patent Number: 5,997,159
[45] Date of Patent: Dec. 7, 1999

[54] VEHICLE LIGHT ASSEMBLY

[75] Inventor: Nan Huang Huang, Rancho Palos Verdes, Calif.

[73] Assignee: Grand General Accessories Manufacturing Inc., Compton, Calif.

[21] Appl. No.: 09/044,103

[22] Filed: Mar. 18, 1998

[51] Int. Cl.[6] .................................................. F21Q 1/00
[52] U.S. Cl. ........................ 362/374; 362/487; 362/546
[58] Field of Search .................... 362/374, 375, 362/487, 495, 496, 501, 505, 506, 546

[56] References Cited

U.S. PATENT DOCUMENTS

| | | | |
|---|---|---|---|
| 1,678,137 | 7/1928 | Douglas | 362/375 |
| 1,737,995 | 12/1929 | Cooke | 362/375 |
| 2,855,502 | 10/1958 | Johnson | 362/501 |
| 5,377,087 | 12/1994 | Yoon | 362/374 X |
| 5,465,199 | 11/1995 | Bray et al. | 362/374 X |
| 5,560,707 | 10/1996 | Neer | 362/374 X |

Primary Examiner—Laura K. Tso
Attorney, Agent, or Firm—Thomas I. Rozsa; Tony D. Chen; Jerry Fong

[57] ABSTRACT

A vehicle light assembly is comprised of a housing, a locking ring mechanism, a socket holding plate, a lens, and an attachment cover. The housing has at least three spaced apart bosses which extend inwardly and located adjacent to a front rim. The retaining ring adapter has an inner ring and an outer ring which is slightly larger than the inner ring. The inner ring has at least three spaced apart locking slots which are aligned with and rotatably engaged with the three bosses of the housing. The outer ring abuts against the front rim outside of the housing, where screws are provided to pull the inner ring against the outer rim so that the locking slots are further engaged with the bosses to further secure the inner ring thereto. The socket holding plate is installed on top of the outer ring of the retaining ring adapter for retaining a socket wherein a light bulb is installed thereto. The lens is placed over the light bulb and secured to the socket holding plate by the attachment cover.

15 Claims, 2 Drawing Sheets

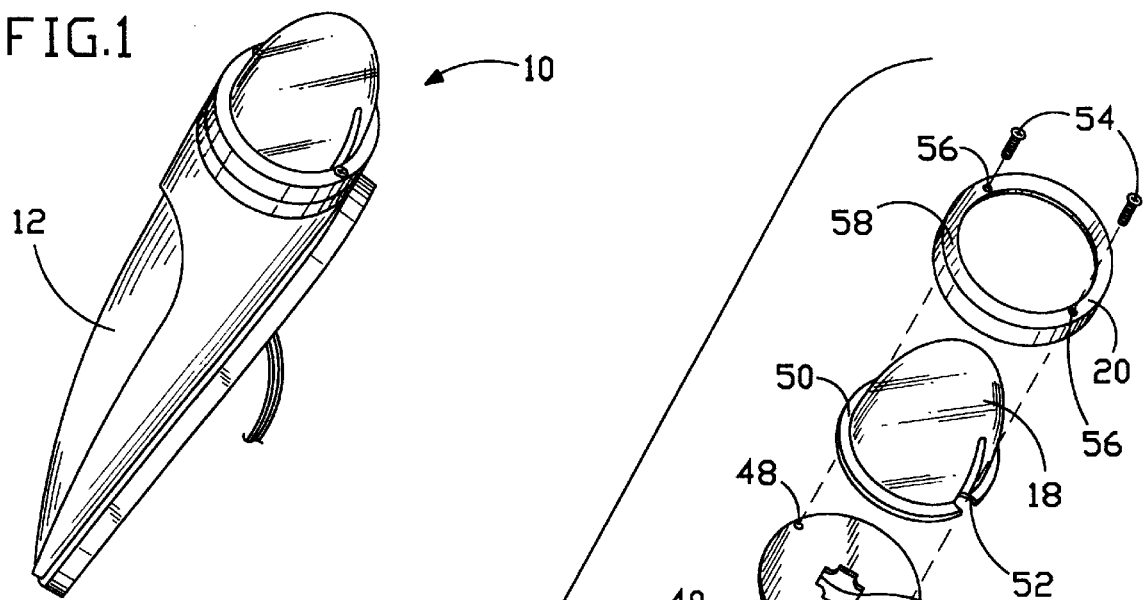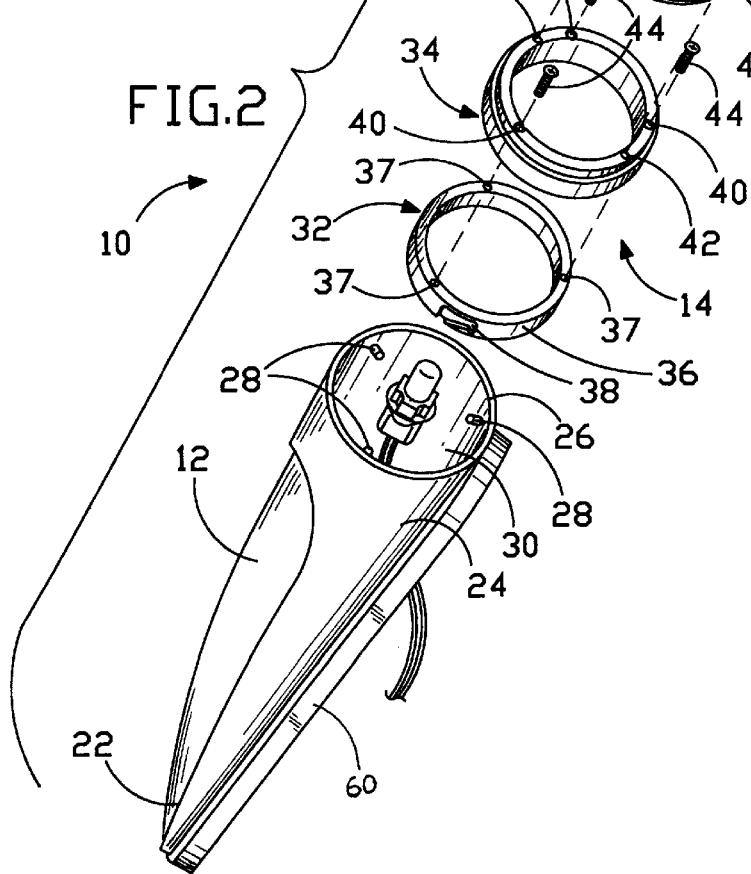

VEHICLE LIGHT ASSEMBLY

BACKGROUND OF THE INVENTION

1. Field of the Invention

The present invention generally relates to the field of vehicle accessories. More particularly, the present invention relates to the field of vehicle light assemblies of the type attached to the body of a vehicle such as a truck.

2. Description of the Prior Art

Generally, prior art vehicle light assemblies are well known in the art. One type of vehicle light assembly includes a housing having at least three spaced apart protruding bosses which extend inwardly inside the housing, a circular retaining ring having at least three spaced apart locking slots respectively aligned with the three protruding bosses and rotatably locked into place and secured to the housing by the three protruding bosses. A dome-shaped lens or any suitable type of lens is then conventional coupled to the retaining ring which in turn is secured to the housing.

The problem with this type of vehicle light assembly is that the retaining ring may become loose after time because of the vibrations caused by the vehicle traveling on the road, and thereby when the retaining ring becomes loose from the housing and falls to the ground, which breaks the lens.

It is desirable to provide a vehicle light assembly with a locking ring mechanism which eliminates the problems associated with the prior art vehicle light assemblies discussed above.

SUMMARY OF THE INVENTION

The present invention is a vehicle light assembly with a novel locking ring mechanism.

It is an object of the present invention to provide a vehicle light assembly with a locking ring mechanism which includes an inner ring and an outer ring, wherein the inner ring is provided with locking slots aligned with and rotatably engaged with the protruding bosses located on the interior of the housing, and further having means for moving the inner ring to abut against the outer ring which is outside of the housing to further secure the locking slots to the protruding bosses, so that the locking ring mechanism does not loosen after time and fallout of the housing and break the lens.

Described briefly, the present invention is a vehicle light assembly which includes a housing, a locking ring mechanism, a socket holding plate, a lens, and an attachment cover. The housing has at least three spaced apart protruding bosses which extend inwardly and located adjacent to a front periphery of the housing. The locking ring mechanism has an inner ring and an outer ring, where the outer ring is slightly larger than the inner ring. The inner ring has at least three spaced apart locking slots which are aligned with and rotatably engaged with the three protruding bosses of the housing. The outer ring abuts against the front periphery outside of the housing, where pulling means are provided to draw the inner ring to abut against the outer ring so that the locking slots are further engaged with the bosses to further secure the inner ring thereto. The socket holding plate is installed on top of the outer ring for retaining a socket wherein a light bulb is installed thereto. The lens is placed over the light bulb and secured to the socket holding plate by the attachment cover by conventional means such as a pair of opposite screws which are threadedly engaged to a pair of threaded apertures located on the outer ring.

Further novel features and other objects of the present invention will become apparent from the following detailed description, discussion and the appended claims, taken in conjunction with the drawings.

DESCRIPTION OF THE DRAWINGS

Referring particularly to the drawings for the purpose of illustration only and not limitation, there is illustrated:

FIG. 1 is a perspective view of the present invention vehicle light assembly;

FIG. 2 is an exploded perspective view of the present invention vehicle light assembly;

DESCRIPTION OF THE PREFERRED EMBODIMENT

Figure 3:
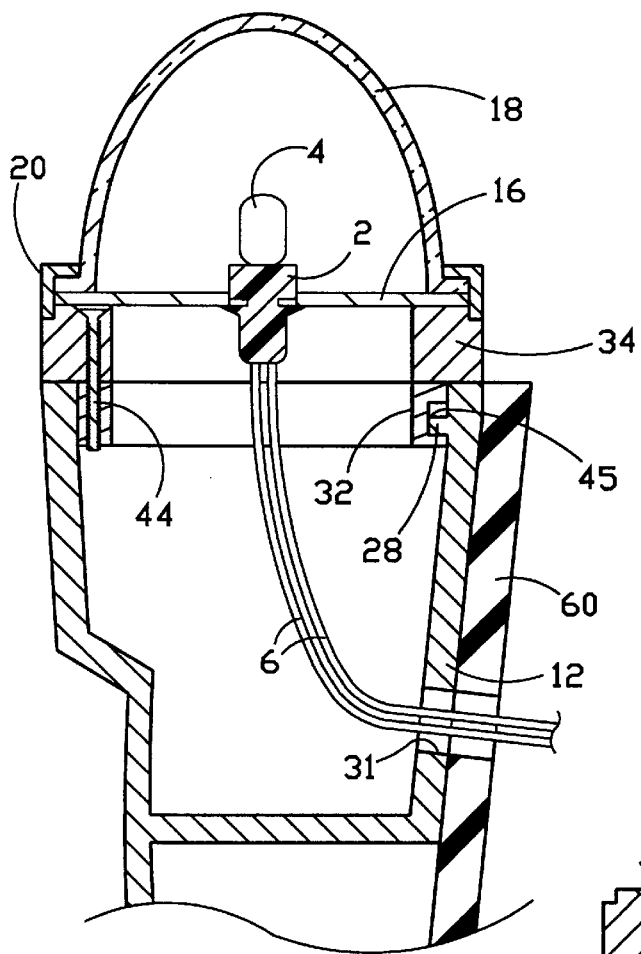
FIG. 3 is a partial cross-sectional of the present invention vehicle light assembly, showing one of the locking slots on the inner ring firmly engaged with one of the protruding bosses on the housing, where screw means pull the inner ring upwardly against the outer ring.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 and 2, there is shown at 10 the present invention vehicle light assembly which comprises a generally elongated housing 12, an unique locking ring mechanism 14, a circular shaped socket holding plate 16, a generally dome-shaped lens 18, and a circular shaped attachment cover 20.

The housing 12 has a distal end 22, a proximal end 24, and a periphery 26 located adjacent to the proximal end 24. Three spaced apart protruding bosses or pegs 28 are integrally formed with an interior surface 30 of the housing 12 and extend inwardly and adjacent to the periphery 26 of the housing 12.

Figure 4:
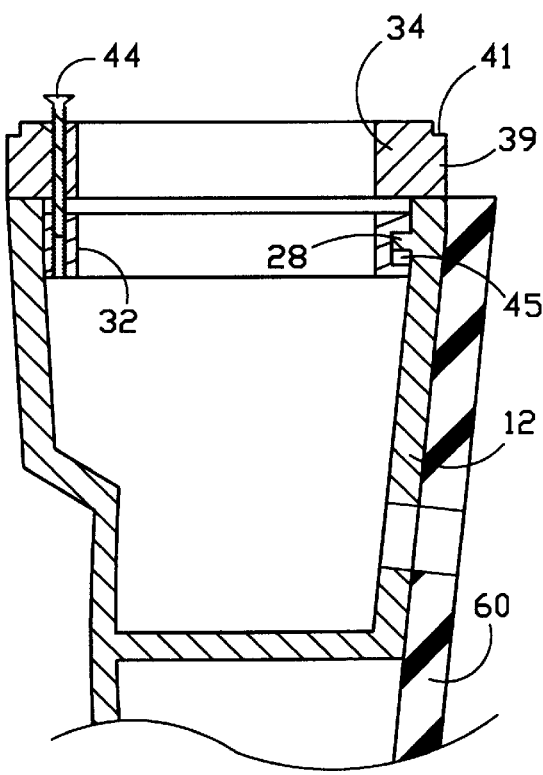
FIG. 4 is a partial cross-sectional view of the present invention vehicle light assembly, showing one of the locking slots on the inner ring loosely engaged with one of the protruding bosses on the housing.

Referring to FIGS. 2, 3, and 4, the locking ring mechanism 14 includes a generally circular shaped inner ring member 32 and a generally circular shaped outer ring member 34. The inner ring member 32 has a circumferential sidewall 36, three spaced apart vertical threaded apertures 37 which extend therethrough, and three spaced apart horizontal locking slots 38 (only one is depicted in FIGS. 2, 3 and 4) which are located on an exterior surface of the circumferential sidewall 36. The inner ring member 32 has an outer diameter which is slightly smaller than the inner diameter of the housing 12, where the inner ring member 32 is rotatably installed thereto and secured within the housing such that the three locking slots 38 are respectively aligned with and engaged with the three protruding bosses 28 of the housing 12 (see FIGS. 3 and 4). The outer ring member 34 has a circumferential sidewall 39 with a step-down section 41, three spaced apart vertical counter-sunk apertures 40 which extend therethrough, and a pair of opposite vertical threaded mounting apertures 42. The outer diameter of the outer ring member 34 is approximately the same diameter as the outer diameter of the housing 12 such that the outer ring member 34 is positioned relative to the inner ring member 32 and abuts against the periphery 26 of the housing 12. Threaded screw means 44 are provided with the locking ring mechanism 14 and are respectively inserted into the three apertures 40 on the outer ring member 34 such that they are threadedly engaged with the three threaded apertures 37 on the inner ring member 32, where the inner ring member 32 is pulled upwardly against the outer ring member 34 such that the three protruding bosses 28 are further engaged within recesses 45 (only one is shown) provided by the three locking slots 38 to further secure the inner ring member 32 to the housing 12.

Referring to FIGS. 2 and 3, the socket holding plate 16 has a configured central aperture 46 for receiving a conventional electrical socket 2 which is installed in the housing 12. The electrical socket 2 receives a light bulb 4 thereto, wherein the electrical socket 2 is electrically coupled to a power source (not shown) by a pair of electrical wires 6 inserted out from the housing 12 through an opening 31. The socket holding plate 16 further has a pair of opposite apertures 48 which extend therethrough. The socket holding plate 16 is positioned on top of the outer ring member 34, where the pair of opposite apertures 18 are aligned with the pair of opposite threaded mounting apertures 42 of the outer ring member 34.

The dome-shaped lens 18 has a circular lower edge portion 50 which surrounds an open end, wherein a pair of opposite gaps 52 (only one is shown) are formed. The dome-shaped lens 18 is positioned relative to the top of the socket holding plate 16 and encloses the light bulb 2, where the pair of opposite gaps 52 are aligned with the pair of opposite apertures 48 on the socket holding plate 16.

The attachment cover 20 is then installed over the dome-shaped lens 18 and abuts against the lower edge portion 50 of the dome-shaped lens 18, where a circumferential sidewall of the attachment cover 20 is seated on the step-down section 41 of the outer ring member 34. A pair of mounting screws 54 are inserted through a pair of apertures 56 provided on the top rim portion 58 of the attachment cover 20, where the mounting screws 54 are threadedly engaged with the pair of threaded mounting apertures 42 on the outer ring member 34 to secure the dome-shaped lens 18 and the socket holding plate 16 therebetween.

The vehicle light assembly 10 may be manufactured with a mounting pad 60 to prevent scratching of the body of the vehicle.

The present invention conforms to conventional forms of manufacture or any other conventional way known to one skilled in the art.

Defined in detail, the present invention is a vehicle light assembly, comprising: (a) a generally elongated housing having a periphery; (b) three spaced apart protruding bosses integrally formed with an interior surface of the housing and extending inwardly and adjacent to the periphery of the housing; (c) an inner ring having a circumferential sidewall and three spaced apart locking slots located on an exterior of the circumferential sidewall, the inner ring being slightly smaller than the diameter of the periphery of the housing, where the inner ring is rotatably installed within the housing and adjacent to the periphery such that the three locking slots are respectively aligned with and engaged with the three protruding bosses of the housing; (d) an outer ring positioned relative to the periphery of the housing and the inner ring and having a diameter slightly larger than the diameter of the periphery of the housing; (e) means for pulling upwardly the inner ring to abut against the outer ring such that the three locking slots further engage with the three protruding bosses to further secure the inner ring to the housing; (f) a circular shaped socket holding plate having a central aperture being adapted for receiving a socket; (g) a generally dome-shaped lens positioned on the socket holding plate for enclosing a light bulb which is installed in the socket; and (h) means for securing the dome-shaped lens to the socket holding plate.

Defined broadly, the present invention is a light assembly, comprising: (a) a housing having a periphery; (b) at least three spaced apart protruding bosses formed with the housing and extending inwardly and adjacent to the periphery of the housing; (c) a first ring member having a circumferential sidewall and at least three spaced apart locking slots located on the circumferential sidewall, the first ring member being slightly smaller than the diameter of the periphery of the housing, where the first ring member is rotatably installed within the housing and adjacent to the periphery such that the at least three locking slots are respectively aligned with and engaged with the at least three protruding bosses of the housing; (d) a second ring member positioned relative to the periphery of the housing and having a diameter slightly larger than the diameter of the periphery of the housing; and (e) means for moving the first ring member to abut against the second ring member such that the at least three locking slots further engage with the at least three protruding bosses to further secure the first ring member to the housing.

Defined more broadly, the present invention is a locking mechanism for use in a light assembly, the locking mechanism comprising: (a) a housing having a perimeter; (b) at least two opposite pegs affixed to the housing and extending inwardly and adjacent to the perimeter; (c) a first locking means having a sidewall and at least two opposite slots located on the sidewall, where the first locking means is rotatably installed within the housing and adjacent to the perimeter such that the at least two slots are respectively aligned with and engaged with the at least two pegs of the housing; (d) a second locking means positioned relative to the perimeter of the housing and the first locking means; and (e) means for moving the first locking means to abut against the second locking means such that the at least two slots further engage with the at least two pegs to further secure the first locking means to the housing.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing fall public disclosure of at least one of its forms. However, such detailed description is not intended in any way to limit the broad features or principles of the present invention, or the scope of patent monopoly to be granted.

What is claimed is:

1. A vehicle light assembly, comprising:
   a. a generally elongated housing having a periphery;
   b. three spaced apart protruding bosses integrally formed with an interior surface of said housing and extending inwardly and adjacent to said periphery of said housing;

c. an inner ring having a circumferential sidewall and three spaced apart locking slots located on an exterior of the circumferential sidewall, the inner ring being slightly smaller than the diameter of said periphery of said housing, where the inner ring is rotatably installed within said housing and adjacent to said periphery such that the three locking slots are respectively aligned with and engaged with said three protruding bosses of said housing;

d. an outer ring positioned relative to said periphery of said housing and said inner ring and having a diameter slightly larger than the diameter of said periphery of said housing;

e. means for pulling upwardly said inner ring to abut against said outer ring such that said three locking slots further engage with said three protruding bosses to further secure said inner ring to said housing;

f. a circular shaped socket holding plate having a central aperture being adapted for receiving a socket;

g. a generally dome-shaped lens positioned on said socket holding plate for enclosing a light bulb which is installed in said socket; and h. means for securing said dome-shaped lens to said socket holding plate.

2. The vehicle light assembly in accordance with claim 1 wherein said pulling means includes at least three screws threadedly engaged with said outer ring member which in turn engages with said inner ring member.

3. The vehicle light assembly in accordance with claim 1 wherein said securing means includes an attachment cover installed over said dome-shaped lens and engaging a lower edge portion of said dome-shaped lens to said socket holding plate.

4. A light assembly, comprising:

a. a housing having a periphery;

b. at least three spaced apart protruding bosses formed with said housing and extending inwardly and adjacent to said periphery of said housing;

c. a first ring member having a circumferential sidewall and at least three spaced apart locking slots located on the circumferential sidewall, the first ring member being slightly smaller than the diameter of said periphery of said housing, where the first ring member is rotatably installed within said housing and adjacent to said periphery such that the at least three locking slots are respectively aligned with and engaged with said at least three protruding bosses of said housing;

d. a second ring member positioned relative to said periphery of said housing and having a diameter slightly larger than the diameter of said periphery of said housing; and e. means for moving said first ring member to abut against said second ring member such that said at least three locking slots further engage with said at least three protruding bosses to further secure said first ring member to said housing.

5. The light assembly in accordance with claim 4 wherein said moving means includes at least three screws threadedly engaged with said outer ring which in turn engages with said inner ring.

6. The light assembly in accordance with claim 4 further comprising a circular shaped socket holding plate having a central aperture being adapted for receiving a socket from said housing.

7. The light assembly in accordance with claim 6 further comprising a generally dome-shaped lens positioned on said socket holding plate for enclosing a light bulb which is installed in said socket.

8. The light assembly in accordance with claim 7 further comprising means for securing said dome-shaped lens to said socket holding plate.

9. The light assembly in accordance with claim 8 wherein said securing means includes an attachment cover installed over said dome-shaped lens and engaging a lower edge portion of said dome-shaped lens to said socket holding plate.

10. A light assembly comprising:

a. a housing having a perimeter;

b. at least one peg affixed to said housing and extending inwardly and adjacent to said perimeter of said housing;

c. a first locking means having a sidewall and at least one slot located on the sidewall, where the first locking means is rotatably installed within said housing and adjacent to said perimeter such that the at least one slot is aligned and engaged with said at least one peg of said housing;

d. a second locking means positioned relative to said perimeter of said housing and said first locking means; and e. means for moving said first locking means to abut against said second locking means such that said at least one slot further engages with said at least one peg to further secure said first locking means to said housing.

11. The light assembly in accordance with claim 10 wherein said moving means includes at least one screw threadedly engaged with said second locking means which in turn engages with said first locking means.

12. The light assembly in accordance with claim 10 further comprising a circular shaped socket holding plate having a central aperture being adapted for receiving a socket from said housing.

13. The light assembly in accordance with claim 12 further comprising a generally dome-shaped lens positioned on said socket holding plate for enclosing a light bulb which is installed in said socket.

14. The light assembly in accordance with claim 13 further comprising means for securing said dome-shaped lens to said socket holding plate.

15. The light assembly in accordance with claim 14 wherein said securing means includes an attachment cover installed over said dome-shaped lens and engaging a lower edge portion of said dome-shaped lens to said socket holding plate.

* * * * *